D. J. CRAIG.
DINNER PAIL.
APPLICATION FILED APR. 19, 1912.
1,043,674.
Patented Nov. 5, 1912.
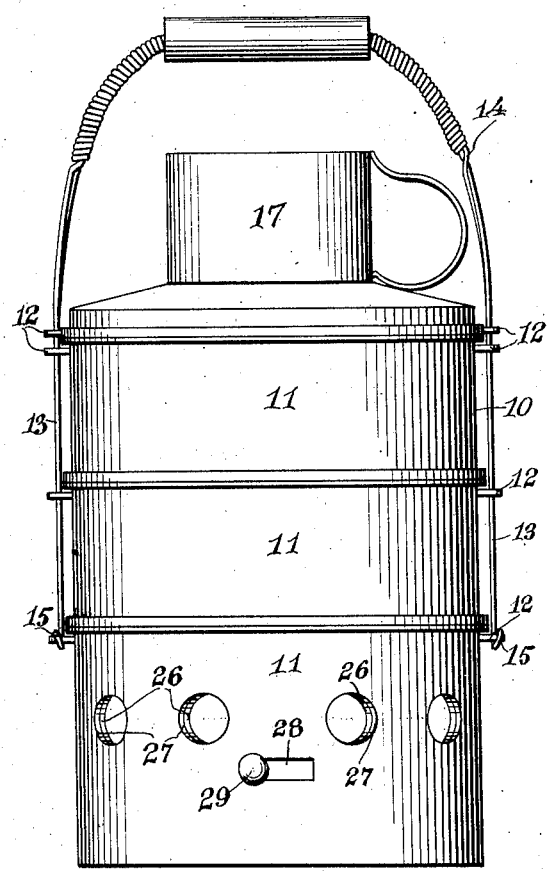
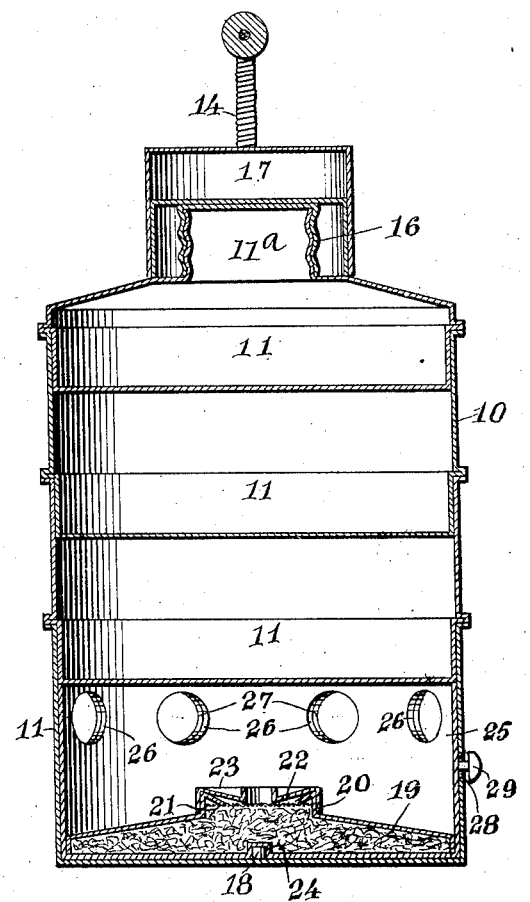
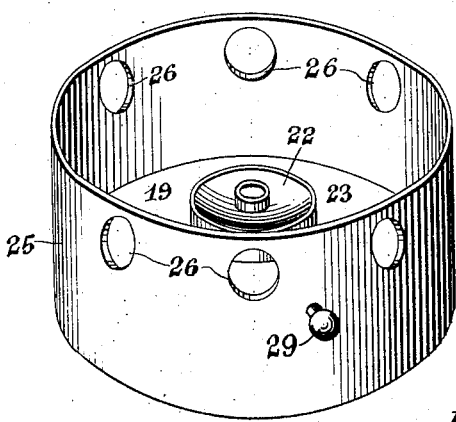
Inventor
David J. Craig
By Victor J. Evans
Attorney
Witnesses

UNITED STATES PATENT OFFICE.

DAVID J. CRAIG, OF HONOLULU, TERRITORY OF HAWAII.

DINNER-PAIL.

1,043,674.  Specification of Letters Patent.  Patented Nov. 5, 1912.

Application filed April 19, 1912. Serial No. 691,802.

*To all whom it may concern:*

Be it known that I, DAVID J. CRAIG, a citizen of the United States, residing at Honolulu, Territory of Hawaii, have invented new and useful Improvements in Dinner-Pails, of which the following is a specification.

An object of the invention is to provide a dinner pail for carrying food and embodying improvements over a patent for a lunch box, granted to me October 31, 1911, No. 1,007,646.

The invention embodies more particularly a dinner pail consisting of a series of superimposed containers adapted to contain food and retained in assembled position by a bail, the lowermost container being provided with means for heating the food contained in the mentioned containers.

In the further disclosure of the invention, reference is to be had to the accompanying drawings constituting a part of this specification, in which similar characters of reference denote corresponding parts in all the views, and in which—

Figure 1 is a side elevation of my device. Fig. 2 is a vertical sectional view. Fig. 3 is a perspective view of the burner and damper.

Referring more particularly to the views, use is made of a pail 10, consisting of a series of superimposed containers 11, each provided with eyes 12 adapted to receive therethrough the shanks 13 of a spring-like bail 14, the lower ends of the said shanks being curved to form hooks 15 adapted to engage the eyes on the lowermost container 11, thus retaining the containers in assembled position, the containers being arranged to fit one within the other, the uppermost container being provided with a filling opening 11ª normally closed by a cap 16, over which is mounted a cup 17, this construction being substantially disclosed in the patent referred to heretofore.

Arranged on the inner side of the bottom of the lowermost container 11 is an upwardly extending pin 18 and revolubly mounted within the container 11 is a casing 19 provided with an opening 20 over which is placed a screen 21 and a cap 22, to form a burner 23, the bottom of the casing 19 being provided with an indentation 24 adapted to receive therein the pin 18 and the mentioned casing having secured to the periphery thereof and extending upwardly therefrom a damper 25 provided with apertures 26 adapted to register with apertures 27 formed in the sides of the lowermost container 11, a slot 28 being provided in the lowermost container 11 and having extended therethrough a handle 29, rigidly secured to the damper 25 so that by operating the handle 29, rotation can be imparted to the damper 25 and the casing 19 so that the apertures 26 can be moved to register with the apertures 27 in the lowermost container 11, the upwardly projecting pin 18 acting as a pivot member for the casing 19 and facilitating the revolving movement of the casing within the lowermost container, it being understood that the apertures in the lowermost container 11 and the apertures in the damper 25 are provided for the purpose of ventilation and draft, the mentioned lowermost container and the casing 19 together with the damper 25, constituting primarily a stove for heating the food contained in the other containers 11, mounted upon and over the lowermost container.

In my previous patent, I have shown a damper provided with openings adapted to register with the openings in the lowermost container, but the damper in this instance is mounted to encircle the container, whereas in the present invention the damper is mounted within the container and when a turning movement is imparted to the damper, the casing 19 will also be operated within the container, this arrangement being more feasible and practical than the construction disclosed in my former patent.

I claim:—

In a dinner pail, the combination with a series of superimposed containers, the lowermost container having apertures therein, of a combined burner and apertured damper rotatably mounted within the lowermost container to register the apertures of the said damper with the apertures in the said lowermost container.

In testimony whereof I affix my signature in presence of two witnesses.

DAVID J. CRAIG.

Witnesses:
 CHARLES BLENNERHASSETT,
 CHRISTIAN STROM.